United States Patent [19]
Redford

[11] Patent Number: 5,459,489
[45] Date of Patent: * Oct. 17, 1995

[54] HAND HELD ELECTRONIC REMOTE CONTROL DEVICE

[75] Inventor: Peter M. Redford, Los Gatos, Calif.

[73] Assignee: TV Interactive Data Corporation, San Jose, Calif.

[*] Notice: The portion of the term of this patent subsequent to Jun. 15, 2010 has been disclaimed.

[21] Appl. No.: 76,032

[22] Filed: Jun. 15, 1993

Related U.S. Application Data

[63] Continuation-in-part of Ser. No. 804,240, Dec. 5, 1991, Pat. No. 5,339,095, and Ser. No. 868,835, Apr. 15, 1992, Pat. No. 5,218,771.

[51] Int. Cl.[6] .................................................. G09G 5/08
[52] U.S. Cl. ........................................... 345/179; 345/158
[58] Field of Search ...................................... 345/156, 157, 345/158, 163–166, 179, 180, 182, 183; 273/148 B, 434, 438, DIG. 28; 250/227.13, 568, 239; 235/472; D14/114, 116; 45/603; 358/194.1

[56] References Cited

U.S. PATENT DOCUMENTS

| 3,371,424 | 3/1968 | Sweet . | |
|---|---|---|---|
| 3,863,067 | 1/1975 | Gooley . | |
| 4,154,000 | 5/1979 | Kramer . | |
| 4,430,526 | 2/1984 | Brown et al. | 345/179 |
| 4,642,459 | 2/1987 | Caswell et al. | 345/179 |
| 4,677,428 | 6/1987 | Bartholow | 250/227.13 |
| 4,682,159 | 7/1987 | Davison . | |
| 4,755,801 | 7/1988 | Gooley . | |
| 4,787,051 | 11/1988 | Olson | 345/179 |
| 4,839,838 | 6/1989 | La Biche et al. . | |
| 4,862,172 | 8/1989 | Ross . | |
| 4,864,647 | 9/1989 | Harrington . | |
| 4,883,926 | 11/1989 | Baldwin | 178/18 |
| 5,045,843 | 9/1991 | Hansen . | |
| 5,059,958 | 10/1991 | Jacobs et al. . | |
| 5,063,376 | 11/1991 | Chang . | |
| 5,068,645 | 11/1991 | Drumm . | |
| 5,086,197 | 2/1992 | Liore | 345/166 |
| 5,115,236 | 5/1992 | Kohler . | |
| 5,142,655 | 8/1992 | Drumm . | |
| 5,218,771 | 6/1993 | Redford | 250/231.1 |

FOREIGN PATENT DOCUMENTS

| 841864 | 11/1989 | Finland . |
| 3236436 | 3/1984 | Germany . |
| 8500817 | 5/1986 | Netherlands . |
| 154030 | 3/1962 | U.S.S.R. . |
| 800637 | 1/1981 | U.S.S.R. . |
| 1244489 | 7/1986 | U.S.S.R. . |
| 2238382 | 5/1991 | United Kingdom . |
| WO90/13792 | 11/1990 | WIPO . |

Primary Examiner—Richard Hjerpe
Assistant Examiner—Chanh Nguyen
Attorney, Agent, or Firm—Skjerven, Morrill, MacPherson, Franklin & Friel; Alan H. MacPherson; Omkar K. Suryadevara

[57] ABSTRACT

A hand held electronic remote control device having orientation sensors, signal processing electronics, power supply and an infrared transmitter contained therein. The sensors include two angular position detectors. A first angular position detector is aligned in a first plane and provides a first detector output. The first and second detector outputs provide responsive inputs to a dividing analog-to-digital converter which transforms the input to a digitally compatible output that is used as an input to a transmitter controller which compares the input to a reference signal and provides a modulation output for driving an infrared light source. The resulting infrared light beam is then carries the modulation signal to a remote receiver via the apparatus to be controlled. The present invention is used to replace the conventional mouse. The receiver would convert a form commensurate with the usual mouse output for compatibility with the usual serial mouse port. The preferred embodiment also includes a plurality of input controls such as "right and left mouse" buttons, a cursor activation button and other control keys.

20 Claims, 6 Drawing Sheets

HAND HELD ELECTRONIC REMOTE CONTROL DEVICE

REFERENCE TO RELATED APPLICATIONS

This application is a continuation-in-part of my previously filed U.S. patent applications Ser. No. 07/804,240 filed Dec. 5, 1991 entitled "Multimedia Pointing Device", now U.S. Pat. No. 5,33 and Ser. No. 07/868,835 filed Apr. 15, 1992 entitled "Orientation Sensing Apparatus", and issued as U.S. Pat. No. 5,218,771 on Jun. 15, 1993.

BACKGROUND OF THE INVENTION

1. Field of the Invention

The present invention relates generally to remote control devices and more specifically to a hand held electronic remote control device for supplying a signal to a remote receiver that is a function of relative angular device orientation and can be used to control a selected remote display or function parameter.

2. Discussion of the Prior Art

A number of different types of remote control devices have been built and successfully used over the years. The number of controlled elements has usually been small in number due to limited requirements but also due to the complexity of operation. In the area of computers and other consumer devices equipment and software sophistication now exceeds most user's ability to effectively interface with the system. For example, most users of VCR's do not find it worth their time to learn how to program a recording of future events. The infrequent need for such sophisticated applications often does not justify the time involved to learn the procedures, and even a relatively simple limited function VCR control has as many as 30 buttons. In order to make more features readily available to the average person a user-to-device interface must be devised that minimizes or eliminates the learning time.

In computer applications one attempt to create a user friendly interface is the invention called the "Mouse" and its use with Windows® application software. The use of a single hand held control to select from printed options on the screen is a highly desirable feature. However, the common mouse is limited in its application by the need for a flat surface upon which to roll the mouse ball and, of course, it is usually a hard wired device.

There is thus a need for a hand held device that can perform mouse functions from a remote position without hard wire and that does not require a surface reference. Examples of potential use for such a device include domestic TV, audio and video equipment, computer driven video and multimedia shows and currently used static slide and overhead projector devices would also benefit greatly from an easy to use remote control mouse-like device.

SUMMARY OF THE INVENTION

It is therefore an object of the present invention to provide a true hand held remote control that supplies output control signals responsive to hand movements. It is a further object of the present invention to provide a hand held remote control capable of enabling hand angular position responsive cursor movement on a TV or computer screen with control signals being transmitted via an infrared light beam from the control device to a remote receiver interfacing with TV or computer.

A still further object of the present invention is to provide a hand held remote control device that is low in cost, small in size and of low power consumption.

Briefly, a presently preferred embodiment of the present invention is a small hand held unit having orientation sensors, signal processing electronics, power supply and an infrared transmitter contained therein. The sensors include two angular position detectors of the type disclosed in applicant's copending U.S. patent application Ser. No. 07/868,835, now U.S. Pat. No. 5,218,771. A first angular position detector senses motion about a first axis and provides a first detector output. A second angular position detector senses motion about a second axis oriented at right angles to the first axis, and provides a second detector output. The first and second detector outputs provide responsive inputs to a dividing analog-to-digital converter which transforms the input to a digitally compatible output that is used as an input to a transmit controller which compares the input to a reference signal and provides a modulation output for driving an infrared light source. The resulting infrared light beam then carries the modulation signal to a remote light receiver via the apparatus to be controlled. The present invention is used to replace the conventional mouse. The receiver would convert the modulated infrared light beam to a form commensurate with the usual mouse output for compatibility with the usual serial mouse port. The preferred embodiment also includes a plurality of input controls such as "right and left mouse" buttons, a cursor activation button and other control keys.

The present invention has the advantage over prior art remote controls in that it provides a user with a significant degree of control. Although the device can be utilized for a great many control applications, its immediate potential is believed to be in performing mouse-like cursor and selection procedures on TV and computer type screens.

These and other objects and advantages of the present invention will no doubt become apparent to those skilled in the art after having read the following detailed description of a preferred embodiment which is illustrated in the several figures of the drawings.

DETAILED DESCRIPTION OF THE PREFERRED EMBODIMENT

Figure 1:
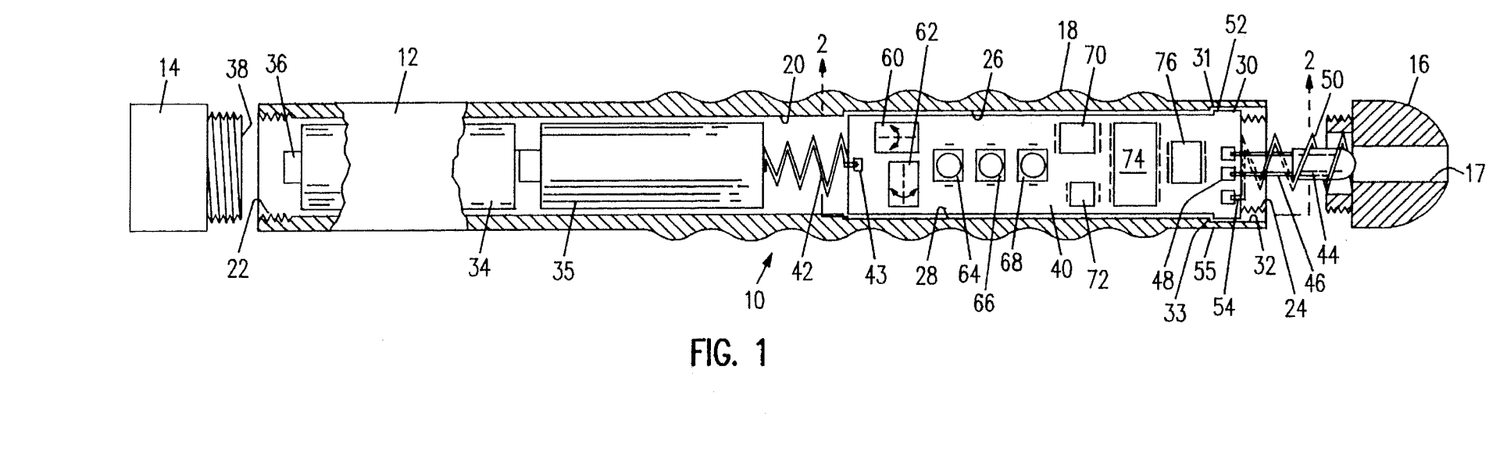
FIG. 1 is a partially exploded longitudinal cross-sectional view illustrating a preferred embodiment of the present invention.

Referring now to FIG. 1 of the drawing, a hand held remote control device in accordance with the present invention is shown in exploded broken section at 10 and includes an elongated cylindrical body 12 having a tail end cap 14 and a head end cap 16. Body 12 is preferably of a metal or other conductive material and has a cylindrical outer surface with the exception that a portion of its length includes an undulating surface 18 that facilitates the gripping thereof in the hand of the user. The interior of body 12 is in the form of a cylindrical bore 20 which is tapped at the tail end as depicted at 22, and at the head end as depicted at 24. In addition, a pair of slots 26 and 28 are cut in opposite sides of the interior face 20 with such slots being deepened at 30 and 32 to form shoulders 31 and 33.

Disposed within bore 20 proximate the tail end of housing 12 are a pair of batteries 34 and 35 having their positive terminals 36 directed rearwardly so that they are serially coupled together, with the positive terminal 36 of battery 34 engaging the threaded end 38 of tail cap 14. Disposed within slots 26 and 28 is a circuit board 40 including a plurality of electrical traces (not shown) used to interconnect various electrical components depicted as rectangles thereon. In addition, at the tail end of board 40 a spring 42 is attached for simultaneously acting as a means of electrically connecting the negative terminal of battery 35 to a contact pad 43 on board 40 and for providing a resilient force for urging batteries 34 and 35 into contact with the end cap 14. Positioned at the opposite end of board 40 is a light emitting diode (LED) 44, the leads 46 of which are attached to a pair of contact pads 48. Note that the leads 46 provide a cantilever support for diode 44. Disposed about diode 44 is a spring 50 which engages the head end of board 40 and the tail end of head cap 16 to serve as a means of resiliently biasing the board shoulders 52 into engagement with the body shoulders 31. The tail end 54 of spring 50 is soldered to a contact pad 55 on board 40 and serves to provide a positive voltage supply terminal to which positive potential can be applied from batteries 34, 35 via end cap 14, body 18, head cap 16 and spring 50.

Figure 2:
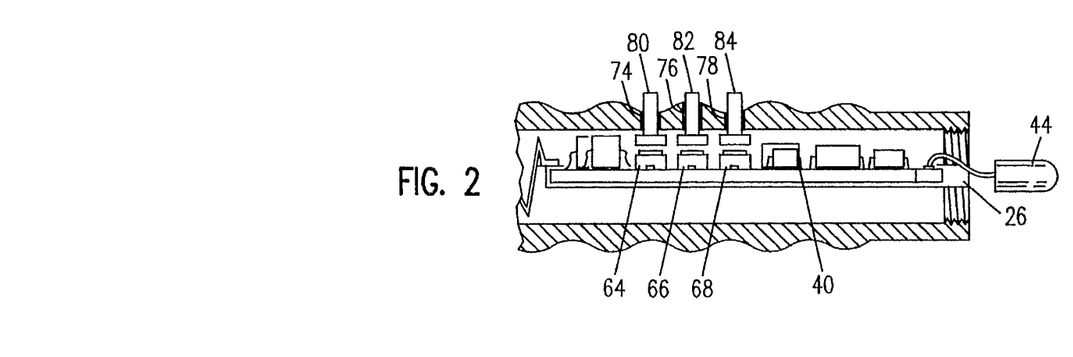
FIG. 2 is a partial cross-sectional view taken along the line 2—2 of FIG. 1.

As previously alluded to, several electrical and electronic components are mounted upon board 40 and include a pair of orientation sensors 60 and 62, three switches 64, 66 and 68, a converter 70, an oscillator 72, a transmit controller 74 and a transmitter driver 76. In FIG. 2, a cross section taken generally along the line 2—2, a side view of board 40 is depicted showing the components resident on the top surface of the board. However, it will be appreciated that components could be affixed to both sides of board 40. Also shown in FIG. 2 and extending through apertures 74, 76 and 78 in body 18 and positioned immediately above the switches 64, 66 and 68, respectively, are push buttons 80, 82 and 84 which provide a means for manually actuating the switches 64–68. Depending upon the type of device used for the switches 64–68, the buttons 80–84 may or may not require springs to return them from a switch actuating state to a non-actuating state.

Returning again to FIG. 1, it will be noted that the head end cap 16, in addition to being threaded on its back side to engage the threads 24 tapped in housing 18, is also provided with an axial bore 17 for receiving the LED 44, with the distal end thereof positioned through or proximate to the outer opening of bore 17.

Figure 3:
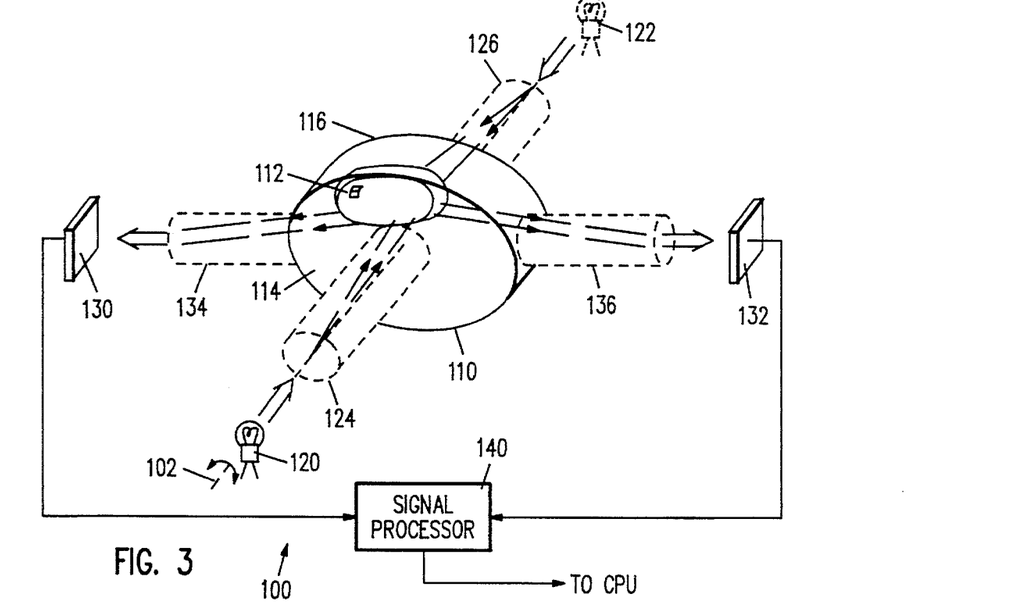
FIG. 3 is a pictorial view illustrating the operative components of an angular orientation sensor in accordance with the present invention.

Turning now to FIG. 3 of the drawing, a functional representation of the functional components of sensors 60 and 62 is shown at 100. The function of the illustrated assembly is to detect angular orientation or motion about a generally horizontally disposed axis 102 and to produce electrical signals corresponding thereto. Note for example in FIG. 1, that as suggested by the orientation of the rectangular blocks 60 and 62, the identical devices 60 and 62 are positioned orthogonally with regard to each other with their corresponding axes disposed in a plane parallel to the plane of the circuit board 40. The sensor depicted in FIG. 3 includes a transparent cylindrical container 110 for containing a liquid, such as a light oil, and has a bubble 112 suspended in such liquid so that it rises to the highest point of the container as illustrated. The container 110, and hence the bubble 112, are illuminated by a light source 120 positioned along the axis of rotation 102 of the cylinder and directed through one of the flat end faces 114 or 116. The materials used to form the bubble 112 and the liquid 116 are preferably chosen so that the interface formed between them is highly reflective. For example, an air bubble in oil is used in one embodiment.

Two light measuring sensors 130 and 132 are positioned facing each other on opposite sides of container 110, typically along a diameter of the container, i.e., typically 180° apart around the circumference of the container so as to receive light reflected from the surface of bubble 112. Optionally, suitable light conducting means may be used to form light pathways 124, 134 and 136 to communicate the light from the source 120 to the container 110, and from the container to the sensors 130 and 132. The outputs of the sensors 130 and 132 are fed to signal processing circuitry 140 which produces an orientation signal that is proportional to the relative amounts of light reflected from bubble 112 to the two sensors. The signal developed by processor 140 is then output to a processing unit (a CPU) as will be further discussed below.

The cylindrical container 110 is preferably shaped as a relatively short cylinder, the diameter of which significantly exceeds its axial length. Ideally the axial length of container 110 will be approximately equal to the width of the bubble 112 (in the axial direction). The container may be formed as a separate transparent container or it may be formed as a cylindrical cavity in a transparent housing (not shown). Light source 120 may be a light emitting diode (LED) or any other suitable light source. Sensors 130 and 132 may be photoconductive diodes, phototransistors, or any suitable devices which are sensitive to light intensity.

The light source 120 and sensors 130 and 132 are fixed relative to the container 110 by any suitable means. The light passageways 124, 134 and 136 may be undefined and be merely pathways through a transparent block in which the cylindrical cavity 110 is formed, or may be formed of optical fibers, light pipes or any other medium suitable for communicating light. If means forming defined pathways are used, the means forming the pathway 124 must be configured and located so that light is transmitted along the central axis 102 of container 110 to illuminate the bubble 112, and the means forming the pathways 34 and 136 must be configured and located so that light reflected from the bubble 112 is conducted therealong to the detectors 130 and 132. The size of the bubble 112 and the spread of the light beam emitted from source 120 must be such that the bubble is always illuminated at any position it may assume within the container 110.

In operation, as the detector assembly 100 is rotated about the axis 102 (the axis of rotation of container 110), bubble 112 will move relative to the interior circumference of the cylindrical chamber formed by container 110 in response to gravitational forces acting on the heavier liquid. Light from source 120 passing through the flat end face 114 will be reflected from the reflective interface between the bubble 112 and the liquid. The angular rotation of the detector is detected by measuring the amount of reflected light that falls upon each of the two light measuring sensors 130 and 132 facing each other on opposite sides of the container 110. The sensors produce differential currents in relation to the angular position of bubble 112 relative to the container. More specifically, as the bubble moves relative to the interior circumference of the container 110, more light will be reflected to one sensor than to the other causing the current from one sensor to decrease, as the current from the other sensor increases. Sensor currents are equal when the bubble 112 is positioned at 90 (or 270) degrees relative to the center line of pathways 134 and 136 (the "level" condition) and differ when the bubble is at any other position. The sensor currents are fed to signal processing circuitry 140 which compares the currents and produces a corresponding orientation signal in a form readily usable by a microprocessor.

Optionally, a second light source 122 may also be mounted along the axis 102 on the opposite side of the container 110 to transmit light via the pathway 126 and through the flat end face 116 in order to provide additional illumination of bubble 112. This provides the benefit of making the sensor relatively insensitive to off axis rotation because movement of the bubble closer to either flat end face of the container (which would be the result of off axis rotation) does not materially affect the total amount of light reflected to each sensor.

The illustrated motion detector is capable of detecting angular orientation about one axis, i.e. the central axis 102, which is the axis of the rotation of the cylindrical container 110. Ideally the axis 102 would have a generally horizontal direction, but the device will be functional in indicating angular orientation about any non-vertical axial orientation. In order to simultaneously detect two-dimensional orientation, two angular motion detectors are required, mounted with their respective central axis oriented perpendicular to each other as suggested in FIG. 1.

In traditional electronic: devices, signal processing circuitry for the conversion of low level analog signals for computer processing in real world noisy environments commonly consisted of two stages, amplification of the signal by a conventional instrumentation amplifier and conversion to a digital signal format by an analog-to-digital converter (ADC). Conventional instrumentation amplifiers based upon an IC op amp have traditionally been used for such signal processing applications due to their inherent rejection of common mode noise and their linear application of VCC and low frequency AC signals. Since a desired low level signal may have an amplitude of only a few millivolts, while common mode noise may be several volts, common mode rejection is critical to the overall accuracy of the amplifier. However, several problems exist with conventional instrumentation amplifiers: they are often expensive; they offer only finite amplification and so must often be followed with single ended amplifier stages; they have an input voltage offset which limits their ability to amplify very small (submillivolt) signals; and their output is analog. For computer applications, such amplifiers must therefore be converted to a digital signal format using an expensive ADC where noise is easily picked up and accuracy is easily lost.

The signal processing circuitry 140 developed for use in accordance with the present invention functions as a digital instrumentation amplifier (DIA) which converts low level differential analog signals to a digital signal format readily usable by a microprocessor. This novel circuitry overcomes the problems associated with conventional instrumentation amplifiers and analog to digital converters because a double ended analog signal is input directly into the DIA, in many cases requiring no preamplification. The output of the DIA is a pulse width modulated (PWM) square wave that can be applied directly to a microprocessor for analysis. This output wave form contains the double ended (differential) signal information and the microprocessor can digitally filter out any noise. Since the information is carried in differential form, common mode noise is automatically rejected because such noise is applied to both signals equally, thus effectively cancelling the common mode noise.

Figure 4:
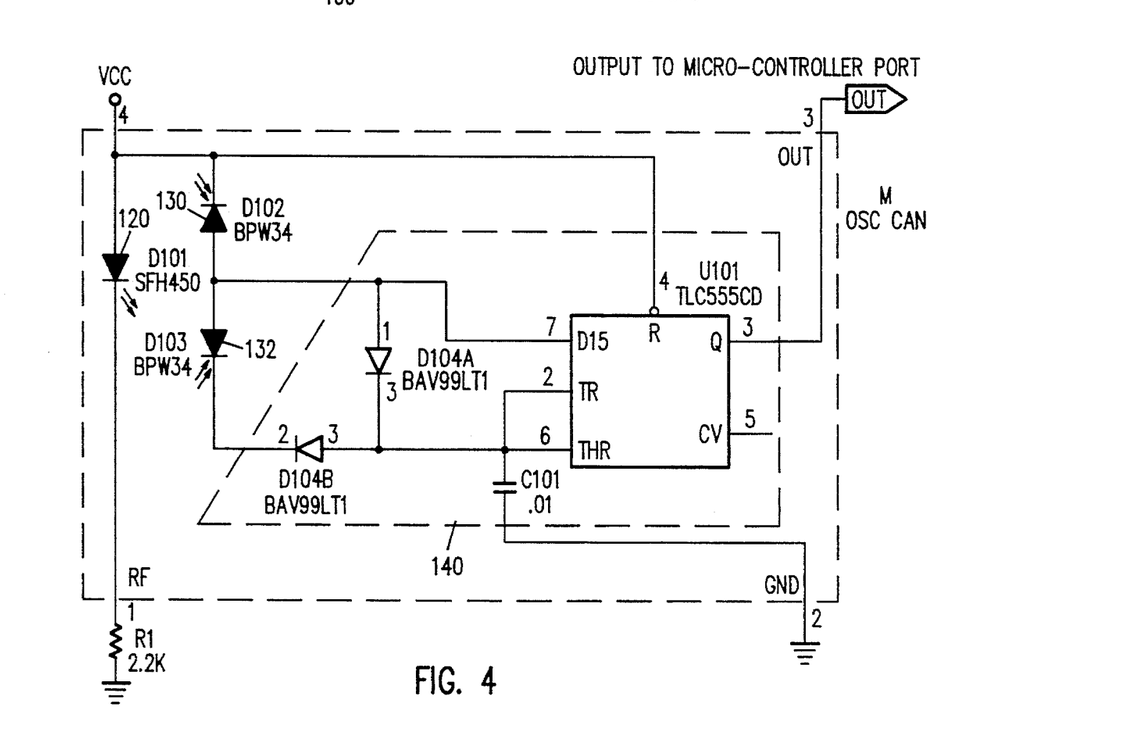
FIG. 4 is a circuit diagram further illustrating the sensor of FIG. 3.

In FIG. 4 an actual implementation of the device of FIG. 3 is shown including a Siemens SFH450 fiber optic emitter used as the light source 120, and including Siemens BPW34 photodiodes as the sensors 130 and 132. The signal processing circuitry 140 is comprised of a Texas Instrument TLC555C timer chip U101, Motorola BAV99LT1 dual switching diodes D104A and D104B and a 0.01 µF capacitor C101. Four I/O connections are provided to allow connection to and from the device: VCC, OUT, RF and GND. VCC and GND are standard electronic power and ground level connections, and OUT provides an output connection for the pulse width modulated (PWM) output signal. RF (frequency resistor) is provided for connection of an external resistor that determines the relative frequency of oscillation of the output signal.

The signal processing circuitry 140 used in the present embodiment is configured as a 50% duty cycle oscillator. In this configuration the capacitor C101 is alternately charged through photodiode 130 and switching diode D104A, and is discharged through photodiode 132 and switching diode D104B. Device U101 is designed to hold its output (pin 3) high when C101 is charging, and low while it is discharging, thus producing a square wave output.

The respective levels of illumination of photodiodes 130 and 132 determine the rate at which C101 is charged and discharged. Hence, if both photodiodes are equally illuminated (a "level" condition), the charge rate and discharge rate are equal, thus making the duty cycle of the square wave output 50%. If illumination of the photodiode does not equal the duty cycle of the output, it is not 50%. That is, as one photodiode receives more current than the other, the high (or low) portion of each cycle of the square wave output will occupy a larger percentage of the total output waveform thus indicating a change in angular position. Hence, the relative change in duty cycle of the output represents relative angular motion (or position).

The input to the DIA is truly differential since any electrical or optical common mode noise present in the system is applied equally to both photodiodes 130 and 132, having equal effect on the high and low portions of the square wave oscillator output wave form. This noise is thus automatically cancelled out when the microprocessor calculates relative position values from the oscillator output by computing the difference between the high and low portions of the square wave output.

The Siemens SF450 fiber optic emitter 120 is connected to the VCC connection to receive power and is connected via connection RF to a resistor R1 which provides a path to ground. The resistance of R1 determines the amount of current which passes through emitter 120 thereby determining the amount of light emitted thereby. This determines the amount of light received by photodiodes 130 and 132, which in turn determines the oscillation speed of the signal processing circuit 140 and the output signal. Thus, the resistor R1 connected to the RF connection determines the oscillation frequency of the optic signal.

Figure 5:
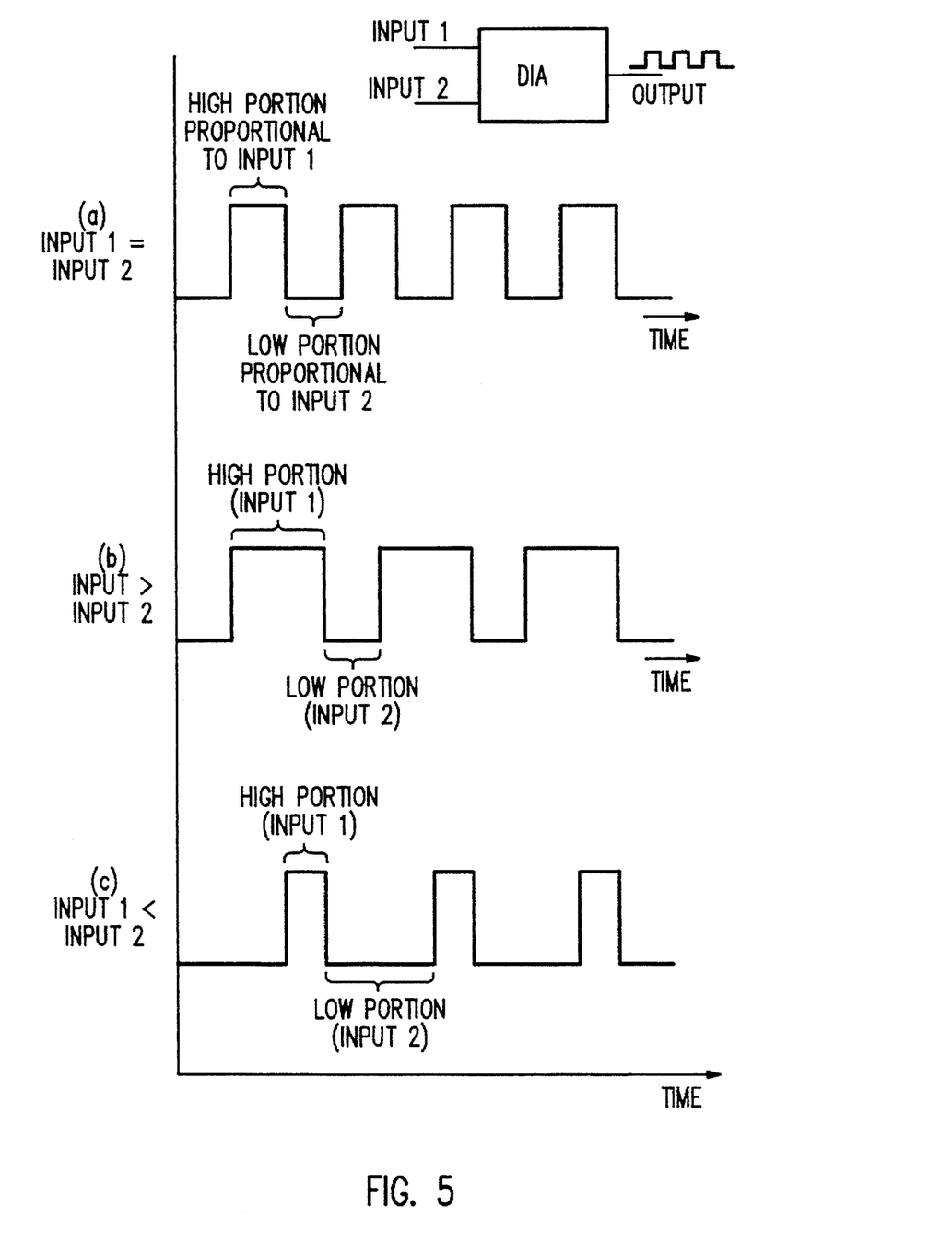
FIG. 5 is a timing diagram illustrating operation of the sensor depicted in FIGS. 3 and 4.

FIG. 5 illustrates graphically the pulse width modulated square wave output of a DIA as it varies over time. As indicated in the figure, the amount of time that the output is held high is proportional to the value of the first analog input, and the amount of time that the output is held low is proportional to the second analog input. Part (a) of FIG. 5 depicts the DIA output wave form when both analog inputs are of equal value, part (b) represents the output wave form when the value of the first analog input exceeds the second, and part (c) depicts the condition when the second analog input exceeds the first. In the context of the orientation sensor of the present invention, part (a) would represent a "level condition", part (b) would represent a tilt in one direction around the cylindrical axis, and part (c) would represent a tilt in the other direction around the cylindrical axis.

The DIA described above is capable of processing signals from any sort of resistive sensors, including voltage, current, light or temperature control resistors. The configuration of the DIA used in the present invention processes signals from light controlled resistors in the form of photodiodes.

Figure 6:
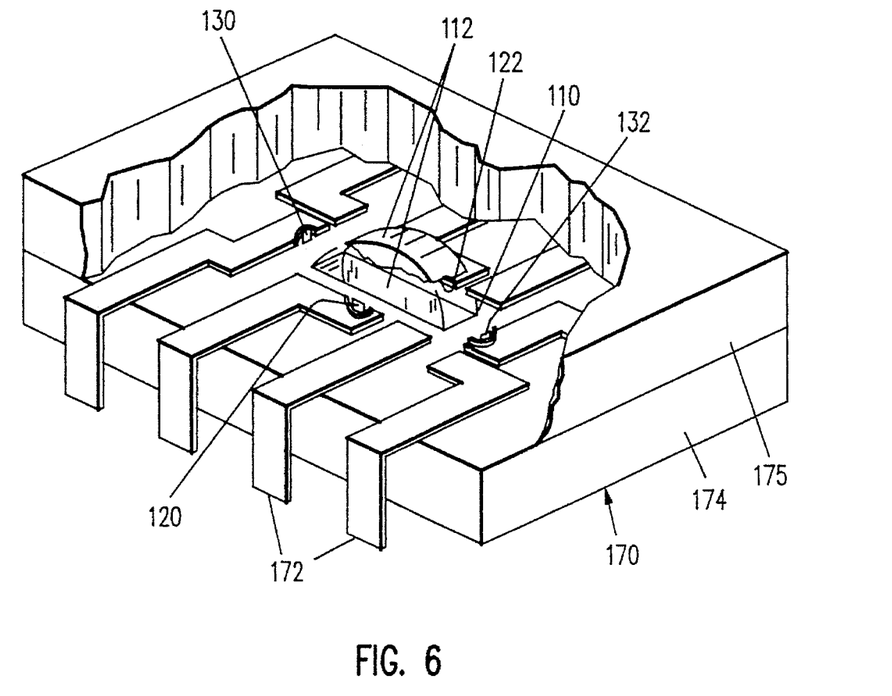
FIG. 6 is a partially broken illustration of one implementation of a sensor in accordance with the present invention.

In FIG. 6 of the drawing, a schematic embodiment of a sensor in the form of a dual in-line packaged (DIP) device 170 is depicted as being formed by sandwiching electronic components 120, 130 and 132 and conductive traces 172 between two rectangular plastic sections 174 and 175 (the upper section 175 being substantially cut away to show the internal components). A sealed cylindrical cavity 110 is formed by two complementary semi-circular recesses or indentations 112 formed in the interior faces of the sections 174 and 175. The cavity formed by container 110 is nearly filled with a suitable liquid, such that a small air bubble is left in the cavity. Two infrared light emitting diodes (LED's) 120 and 122 are positioned in the housing facing each other along the central cylindrical access of container 110 so that they each illuminate one of the flat end faces of the cavity. Two infrared photodiodes 130 and 132 are positioned in the housing on opposite sides thereof around its circumference. Eight conductive traces 172 are connected to the LED's and the photodiodes, and protrude from the DIP 170 forming leads for connection to external circuitry. The DIP sections 174 and 175 are preferably fabricated from a material that is transparent to infrared light and is preferably of daylight filter plastic so that ambient light does not affect the infrared photodiodes. In this implementation, the DIP device signal processing circuitry (not shown) would normally be mounted separately on a supporting circuit board in similar fashion to that illustrated in FIG. 1.

Figure 7:
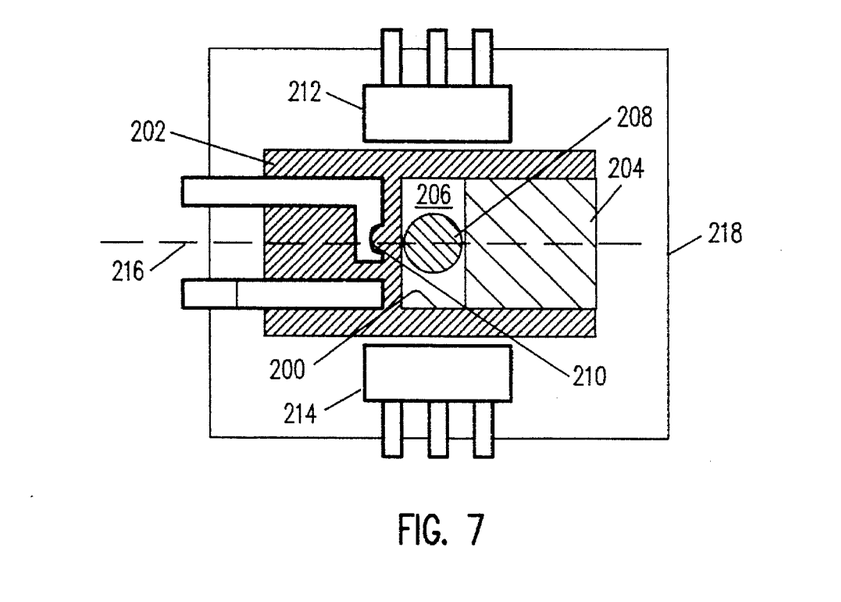
FIG. 7 is a diagram schematically illustrating an alternative sensor design.

In FIG. 7 an alternative form of the present invention is shown wherein the motion detector modules 60 and 62 (FIG. 1) are implemented by means of a transparent cylindrical container formed by an axial bore 200 formed in a cylindrical block 202. A plug 204 forms a closure for the cylindrical chamber 206 in which a suitable liquid is deposited. A slight amount of air or other suitable gas is also provided within chamber 206 to form a gas bubble 208. At the opposite end of the cylinder 202 an infrared LED 210 is provided which illuminates the bubble. On both sides of the cylindrical container are photodiodes 212 and 214, respectively. When the sensor is in the horizontal position, i.e. when the axis of rotation 216 is horizontally disposed the bubble 208 is centered between the two photodiodes. The bubble acts like a reflective lens and both photodiodes receive equal amounts of reflected light. As the module is rotated about the axis 216, the bubble remains stationary and gradually redirects light from one photodiode to the other. Each photodiode acts like a current source producing a current which is directly and linearly proportional to the amount of incident light. A miniature plastic enclosure suggested by the rectangle 218 is used to house all three components comprising the motion detector. This ensures proper and repeatable alignment of the components.

Figure 8:
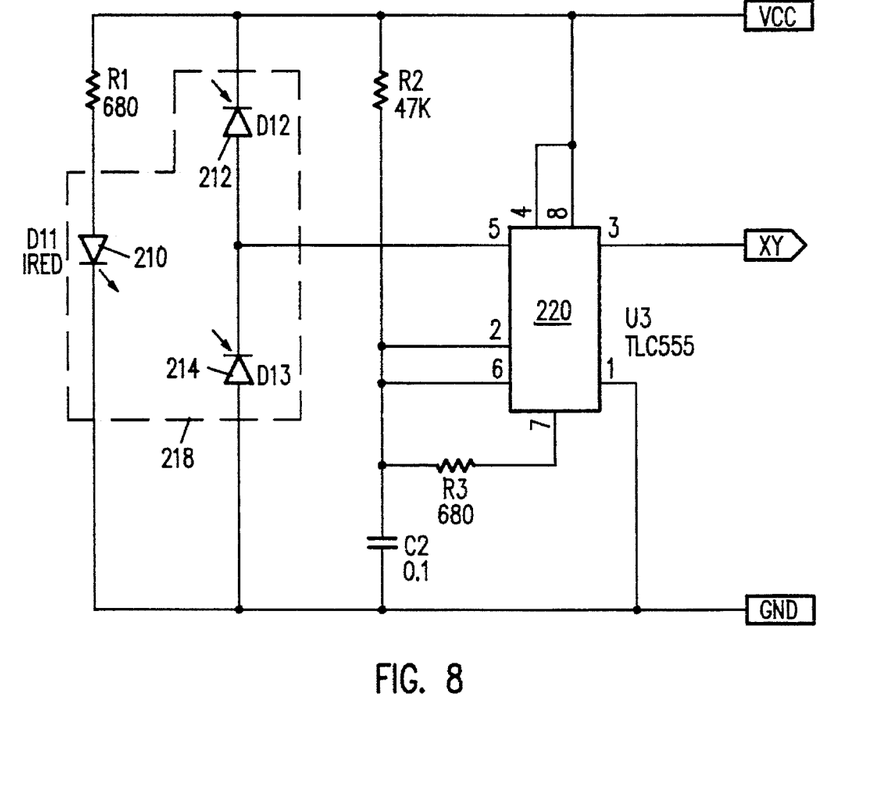
FIG. 8 is a circuit diagram showing an alternative to the sensor embodiment of FIG. 4.
Figure 9:
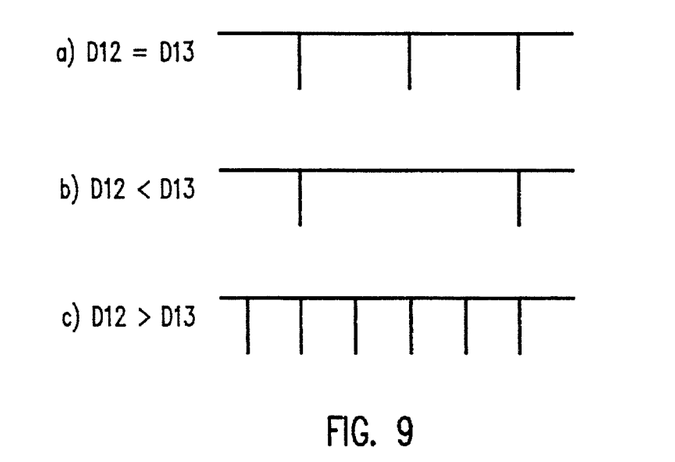
FIG. 9 is a timing diagram.

As depicted in the corresponding circuit diagram shown in FIG. 8, the current from each photodiode 212, 214 is digitized by feeding it into a pulse width modulator formed by a CMOS 555 timer chip 220 to produce a pulse width modulated (PWM) waveform that is ready for input to a computer. The timer 220 is configured as an astable multivibrator (a free-running oscillator). The output of the timer is high as the capacitor C2 charges through a resistor R2. When the voltage across C2 reaches two-thirds of VCC, C2 is discharged through a resistor R3. Note that the charge time through the 47 K resistor R2 is relatively slow, and the discharge through the 680 ohm resistor R3 is very fast. The resulting wave form is shown in FIG. 9.

The motion detector is connected to the timer 220 so that photodiode 212 supplies current to the timer's control input and the photodiode 214 takes away current from the control input. Resistor R1 sets the brightness of the infrared LED 210 which illuminates the bubble. The result is that the XY output of the pulse width modulator is directly proportional to the ratio (not the difference) of the light incident on the two photodiodes 212 and 214. The ratio relationship is critical because it provides the circuit with power supply voltage independence and excellent noise immunity without a voltage reference, a voltage regulator or a large filter capacitor. When both photodiodes receive equal illumination (reflected from the centered bubble), diode 214 takes away exactly the same amount of current as diode 212 supplies resulting in zero net current at the timer's control input. The resulting PWM waveform is thus not affected and remains at center frequency determined by R2 and C2. Any light imbalance (reflected from an uncentered bubble) produces a net current to or from the timer control input and changes the frequency of the PWM wave form as depicted in parts (b) and (c) in FIG. 9.

Figure 10:
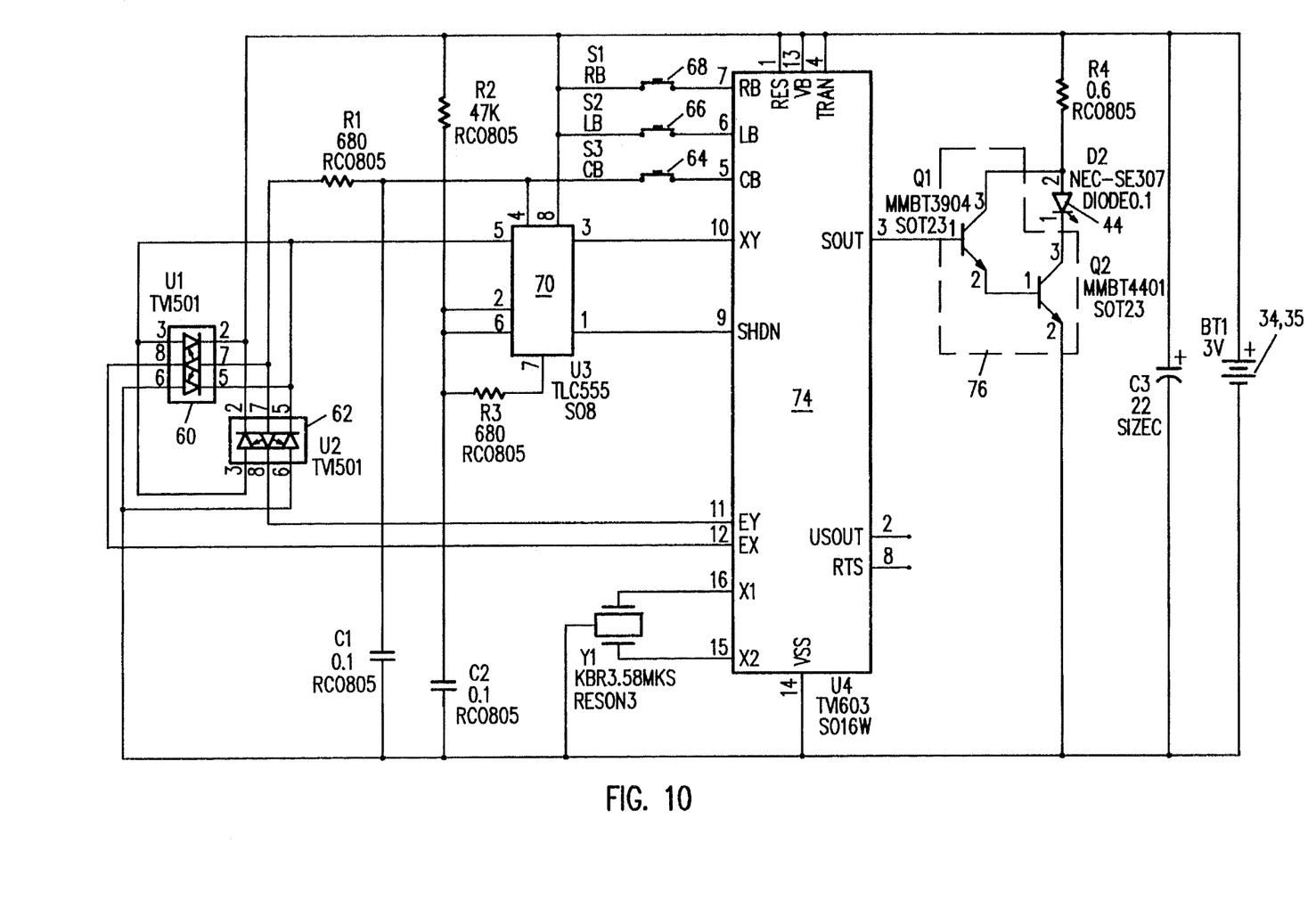
FIG. 10 is a schematic diagram illustrating the principal functional components of the embodiment illustrated in FIG. 1 and 2.

In FIG. 10 a complete schematic of the device depicted in FIG. 1 of the drawing is illustrated. In order to detect both the X and Y motion of the hand held device, two motion detectors designated is TVI501 motion detectors 60 (U1) and 62 (U2) are actually connected to a single 555 timer 70 (U3). The TVI603 transmit controller 74 (U4) provides multiplexing signals (EX and EY) which allow the timer 70 to only see one motion detector at a time. This is done by selectively illuminating only one bubble at a time when either the EX or the EY signal goes low. The transmit controller 74 interfaces directly to the output of the pulse width modulator 70 through its XY pin. After selecting a motion detector (60 or 62) the transmit controller 74 measures the resulting pulse width, and generates a corresponding digital value. It then uses the digital value representing the pulse width to generate a value corresponding to a change (delta) in X or Y by subtracting the current value from the old value stored in memory. Each delta value is then digitally filtered to eliminate hand jitter. The output of transmitter 74 is then coupled to the LED 44 through a transmitter driver circuit 76. Switches 64, 66 and 68 activate the transmit controller 74 to energize the remote control device and select a particular function. Switch 64 specifically activates the transmit controller 74 to select the position indicating function, causing the generation of the delta value described above, which is applied as a modulation signal to the transmitter driver 76, which then modulates the LED 44.

Switches 66 and 68 activate the transmit controller 74 to generate left and right modulation signals carried by the LED 44 and converted by the receiver to serve the usual left and right Mouse button functions. In addition, the switches 66 and 68 represent any number of switches for generation of special function modulation signals according to specific needs.

It will thus be appreciated that in accordance with the present invention an extremely compact and convenient to hold and manipulate remote control apparatus has been provided which is capable of transmitting to a remote infrared receiver the full equivalent of all the types of motion and signal transmissions that can be provided by a manual mouse type device. However, because of its compactness, i.e. it is in actuality slightly larger than a fountain pen, it can easily be carried in one's pocket and can be conveniently manipulated by one hand of the user while making a verbal presentation. Because the infrared beam generated by the device is a broad and diverging beam, and further because the infrared light will reflect from most surfaces in a room it is not necessary that the device be pointed directly at the receiver during use.

Although the present invention has been disclosed in terms of certain preferred embodiments it is anticipated that various alterations and modifications thereof will become apparent to those skilled in the art after having read the above disclosure. It is therefore intended that the appended claims be interpreted broadly to cover all such alterations and modifications that fall within the true spirit and scope of the invention.

What is claimed is:

1. A hand held remote control device for enabling a user to communicate device originated signals to a remote receiver used to input command signals to a computer terminal or multimedia unit comprising:

an elongated housing forming a containment chamber having a first end and an opposite end, and having an opening at said first end;

means for closing said first end of said elongated housing;

means forming a communications window at one end of said containment chamber;

first position sensor means for sensing a first orientation of said elongated housing relative to a first axis parallel to the lengthwise dimension of said elongated housing, and having means forming a generally cylindrical first chamber mounted within said elongated housing, and having a first chamber axis oriented substantially parallel to said first axis;

a first rotation responsive element located within said first chamber and free to move therein relative to the perimeter of said first chamber under the influence of gravity as said remote control device rotates about said first chamber axis, said first rotation responsive element being capable of influencing the direction of reflected and transmitted beams of light cast upon said first rotation responsive element as a function Of the location of said first rotation responsive element within said chamber;

at least one light source disposed along said first chamber axis and operative to illuminate said first rotation responsive element; and first and second light sensors disposed on opposite sides of said first chamber and operative to detect light reflected by said first rotation responsive element and to develop first and second current signals corresponding to light influenced by said first rotation responsive element;

second position sensor means for sensing a second orientation of said elongated housing relative to a second axis normal to said first axis, and having means forming a generally cylindrical second chamber mounted within said elongated housing, and having a second chamber axis oriented substantially parallel to said second axis;

a second rotation responsive element located within said second chamber and free to move therein relative to the perimeter of said second chamber under the influence of gravity as said remote control device rotates about said second chamber axis, said second rotation responsive element being capable of influencing the direction of reflected and transmitted beams of light cast upon said second rotation responsive element as a function of the location of said second rotation responsive element within said chamber;

at least one light source disposed along said second chamber axis and operative to illuminate said second rotation responsive element; and third and fourth light sensors disposed on opposite sides of said second chamber and operative to detect light reflected by said second rotation responsive element and to develop third and fourth current signals corresponding to light influenced by said second rotation responsive element;

electronic means disposed within said containment chamber and operative to develop housing orientation signals for transmission through said communications window to said remote receiver;

user interface means for allowing a user to communicate with said electronic means; and power supply means disposed within said containment chamber for supplying operative power to said electronic means.

2. An apparatus as recited in claim 1 wherein said elongated housing further includes an opening at said opposite end to provide access to said containment chamber; and means for closing said opposite end.

3. An apparatus as recited in claim 2 wherein said opening at said first end is a first tapped opening;

said opening at said opposite end is a second tapped opening;

said means for closing said first end has a threaded portion for engagement with said first tapped opening; and said means for closing said opposite end has a threaded portion for engagement with said second tapped opening.

4. An apparatus as recited in claim 1 wherein said elongated housing is fabricated from an electrically conductive material;

said means for closing said first end and said means for closing said opposite end are constructed from an electrically conductive material;

said containment chamber in said elongated housing is a cylindrical bore therethrough having a cylindrical wall with said tapped openings at said first end and said opposite end, said containment chamber having two elongated slots spaced 180 degrees apart in said wall of said bore, and extending inward from said first end;

said power supply means includes a series of one or more batteries having a first battery terminal in contact with said means for closing said opposite end and a second battery terminal; and wherein said electronic means includes circuit board means having a first end and a second end each having conductive portions for conveying power to said electronic means, said circuit board means being configured to be captivatingly engaged in said elongated slots;

spring means for making electrical contact between said second battery terminal and said first end of said circuit board for conveying power to said electronic means; and contact means for connecting said second end to said conductive material for providing an electrical return path to said power supply means.

5. An apparatus as recited in claim 1 wherein said user interface means includes cursor button means responsive to a user's touch for activating said electronic means to generate and transmit said housing orientation signals.

6. An apparatus as recited in claim 1 wherein said electronic means further includes at least one signal generating means responsive to said user interface means and operative to generate and transmit a control signal conveying a control function to said remote receiver.

7. An apparatus as recited in claim 6 wherein said user interface means includes at least one switch means responsive to a user's touch for activating said signal generating means.

8. An apparatus as recited in claim 1 wherein said electronic means further includes pulse width modulation means responsive to the ratio of light incident on said first and second light sensors of said first position sensor means for outputing a first pulse width modulated signal of width dependent on said ratio when said first position sensor means is operative, and responsive to the ratio of light incident on said third and fourth light sensors of said second position sensor means for outputing a second pulse width modulated signal of width dependent on said ratio when said second position sensor means is operative.

9. An apparatus as recited in claim 8 wherein said electronic means further includes a transmit controller means for alternately activating said first and second position sensor means and for creating a modulation signal responsive to the width of said first and second pulse width modulated signals.

10. An apparatus as recited in claim 9 wherein said transmit controller includes at least one signal generating means responsive to said user interface means and operative to generate and transmit a control signal conveying a control function to said remote receiver.

11. An apparatus as recited in claim 10 further comprising:

at least one switch means responsive to a user's touch for activating said signal generating means.

12. An apparatus as recited in claim 11 wherein said transmit controller further includes multiplexing means for alternately empowering said light sources of said first position sensor means and said light sources of said second position sensor means thereby alternately activating said first and second position sensor means.

13. An apparatus as recited in claim 12 wherein said transmit controller further includes cursor signal modulation means responsive to said first pulse width modulated signal indicating a first position of said first position sensor means, creating a corresponding first digital value indicative of said first position, and further responsive to said first pulse width modulated signal indicating a second (later) position of said first position sensor means, for creating a corresponding second digital value indicative of said second (later) position of said first position sensor means, and for comparing said first digital value with said second digital value to create a first delta value;

wherein said cursor signal modulation means is responsive to said second pulse width modulated signal indicating a third position of said second position sensor means, for creating a corresponding third digital value indicative of said third position, and further responsive to said second pulse width modulated signal indicating a fourth (later) position of said second position sensor means, for creating a corresponding fourth digital value indicative of said fourth (later) position of said second position sensor means, and for comparing said third digital value with said fourth digital value to create a second delta value; and wherein said first and second delta values are signals respectively indicative of a change of position of said first position sensor means and of said second position sensor means, and thereby of said remote control device, and are used in creating said housing orientation signals for transmission through said communications window.

14. An apparatus as recited in claim 13 wherein said electronic means further includes a transmitter driver circuit responsive to said delta values and operative to generate a modulation signal; and LED means responsive to said modulation signal and operative to generate a modulated light beam for conveying said device originated signals through said communications window to said remote receiver.

15. The apparatus of claim 13 wherein said first and second light sensors, and said third and fourth light sensors, are arranged to form a voltage divider with the output of said voltage divider providing input to said pulse width modulation means, and wherein said input depends on the ratio of the light sensor resistances, and thereby provides noise immunity.

16. The apparatus of claim 15 wherein said pulse width modulation means includes a type 555 timer with a timer input and timer output and operating as a free running oscillator with a signal pulse width dependent on a voltage supplied to said timer input by connection of said timer input to said output of said voltage divider, said signal pulse width thereby being a function of the ratio of light incident upon said first and second light sensors when said first position sensor means is activated, and being a function of the ratio of light incident upon said third and fourth light sensors when said second position sensor means is activated.

17. An apparatus as recited in claim 14 wherein said user interface means includes cursor button means responsive to a user's touch for activating said electronic means to generate and transmit said housing orientation signals.

18. An apparatus as recited in claim 17 wherein said elongated housing is fabricated from an electrically conductive material;

said means for closing said first end and said means for closing said opposite end are constructed from an electrically conductive material;

said containment chamber in said elongated housing is a cylindrical bore therethrough having a cylindrical wall with said tapped openings at said first end and said opposite end, and said chamber having two elongated slots spaced 180 degrees apart in said wall of said bore and extending inward from said first end;

said power supply means includes a series of one or more batteries having a first battery terminal in contact with said means for closing said opposite end and a second battery terminal; and wherein said electronic means includes circuit board means having a first end and a second end each having conductive portions for conveying power to said electronic means, and said circuit board means being configured to be captivatingly engaged in said elongated slots;

spring means for making electrical contact between said second battery terminal and said first end of said circuit board for conveying power to said electronic means; and contact means for connecting said second end to said conductive material for providing an electrical return path to said power supply means.

19. An apparatus as recited in claim 1 wherein said housing orientation signals are modulated electromagnetic waves transmitted to said remote receiver.

20. An apparatus as recited in claim 19 wherein said electronic means is further operative to generate a control signal in response to user input through said interface means and to use said modulated electromagnetic waves to transmit said control signal to said remote receiver.

* * * * *